3,711,513
1-CHLOROTHIOXANTHEN-9-ONE PREPARATION FROM 2,6-DICHLOROBENZONITRILE

John W. Schulenberg, Bethlehem, N.Y., assignor to Sterling Drug Inc., New York, N.Y.
No Drawing. Filed Oct. 5, 1970, Ser. No. 78,220
Int. Cl. A61k 27/00; C07d 65/18
U.S. Cl. 260—328      2 Claims

ABSTRACT OF THE DISCLOSURE

A process for the preparation of 1-chlorothioxanthen-9-one, an intermediate in the preparation of schistosomacidal agents, e.g., hycanthone, which comprises reacting 2,6-dichlorobenzonitrile with an alkali metal thiophenoxide to yield 2-chloro-6-phenylthiobenzonitrile, heating said benzonitrile with polyphosphoric acid to produce 1-chloro-9-iminothioxanthene and hydrolyzing said 9-imino compound to produce 1-chlorothioxanthen-9-one.

---

This invention relates to a process for preparing a thioxanthen-9-one.

The process comprises reacting 2,6-dichlorobenzonitrile (I) with an alkali metal thiophenoxide (II) to yield 2-chloro-6-phenylthiobenzonitrile (III), heating said benzonitrile with polyphosphoric acid to produce 1-chloro-9-iminothioxanthene (IV) and hydrolyzing said 9-imino compound to produce 1-chlorothioxanthen-9-one (V). The 1-chlorothioxanthen-9-one produced by said process is useful as an intermediate in the preparation of 1-(tert.-aminoalkylamino)thioxanthen-9-ones which are useful as schistosomacidal agents, e.g., hycanthone, i.e., 1-(2-diethylaminoethylamino) - 4-hydroxymethylthioxanthen-9-one.

The process is illustrated structurally by the following flowsheet:

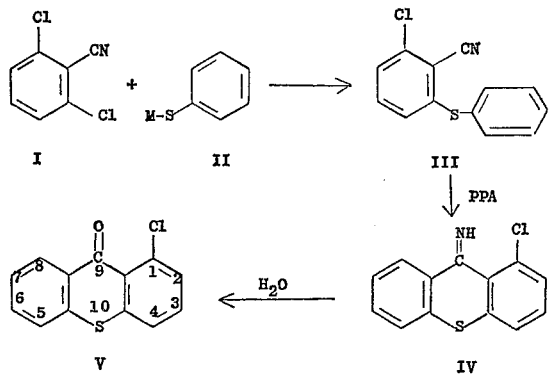

where M is an alkali metal and PPA is polyphosphoric acid.

The utilization of 1-chlorothioxanthen-9-one as an intermediate is disclosed in copending applications as well as hereinbelow.

Disclosed in the Rosi, Miller and Collins copending application Ser. No. 78,222, filed Oct. 5, 1970, is the reaction of 1-chlorothioxanthen-9-one with di-(lower-alkyl)aminoalkylamines to produce 1-[di-(lower-alkyl)aminoalkylamino]thioxanthen - 9-ones. Disclosed and claimed in said Rosi et al. Ser. No. 78,222, is a process of converting 1-[di-(lower-alkyl)aminoalkylamino]thioxanthen-9-ones to 1 - [di - (lower - alkyl)aminoalkylamino]-4-hydroxymethylthioxanthen-9-ones, by reaction with excess formaldehyde under controlled pH conditions. The 1-[di-(lower-alkyl)aminoalkylamino]thioxanthen-9-ones are disclosed and claimed in the Collins and Rosi copending application Ser. No. 78,224, filed Oct. 5, 1970.

Disclosed and claimed in the Collins and Rosi copending application Ser. No. 78,221, filed Oct. 5, 1970, is the three-step process of heating 1-chlorothioxanthen-9-one with an N,N-di-(lower-alkyl)-N'-methylalkylenediamine to yield 1-[di-(lower-alkyl)aminoalkylmethylamino]thioxanthen-9-one, reacting the latter with phosphorus oxyhalide and dimethylformamide to yield 1-[di-(lower-alkyl)aminoalkylmethylamino]-9 - oxothioxanthene-4-carboxaldehyde and reacting said aldehyde with pyridine hydrochloride to produce 1-[di-(lower-alkyl)aminoalkylamino]-9-oxothioxanthene-4 - carboxaldehyde. Also disclosed in said Collins and Rosi application Ser. No. 78,221 is the reductive conversion of 1-[di-(lower-alkyl) aminoalkylamino]-9 - oxothioxanthene - 4 - carboxaldehyde to the corresponding 4-hydroxymethyl compound by reacting said 4-carboxaldehyde with an appropriate reducing agent, e.g., sodium borohydride.

The manner and process of making and using the instant invention will now be generally described so as to enable one skilled in the art of chemistry to make and use the same, as follows:

The reaction of 2,6-dichlorobenzonitrile with an alkali metal thiophenoxide to yield 2-chloro-6-phenylthiobenzonitrile is carried out preferably by heating the reactants in the range of about 50–150° C., preferably between about 80–100° C. The reaction is carried out preferably in a suitable inert solvent, e.g., dimethyl sulfoxide, dimethylformamide, and the like.

The reaction of 2-chloro-6-phenylthiobenzonitrile with polyphosphoric acid to form 1-chloro-9-iminothioxanthene, as its hydrochloride salt is carried out by heating the reactants between about 140–190° C., preferably about 150–180° C. Hydrolysis of the 9-imino salt, preferably without isolating it, to produce 1-chlorothioxanthen-9-one is carried out at room temperature (about 20–25° C.) for several days or at high temperatures, preferably about 50–100° C. for several hours.

The intermediates used in the process of the invention are well known and are either commercially available or can be prepared readily by conventional methods. For example, polyphosphoric acid, a commercially available reagent, is prepared by heating phosphoric acid ($H_3PO_4$) with sufficient phosphoric anhydride ($P_2O_5$) to give the resulting product containing about 82–85% $P_2O_5$; it consists of about 55% tripolyphosphoric acid, the remainder being $H_3PO_4$ and other polyphosphoric acids [The Merck Index, Eighth Edition, page 848, Merck and Co., Inc., Rahway, N.J. (1968)].

The best mode contemplated for carrying out the invention is set forth as follows:

(1) 2-chloro-6-phenylthiobenzonitrile.—To a stirred mixture containing 13.0 g. of potassium tertiarybutoxide suspended in 300 ml. of dimethyl sulfoxide was added dropwise with cooling a solution containing 13 ml. of thiophenol in 50 ml. of dimethyl sulfoxide. To this stirred mixture was added dropwise over a period of thirty minutes 19.0 g. of 2,6-dichlorobenzonitrile in 300 ml. of dimethyl sulfoxide. The reaction mixture was next heated on a steam bath for about two and one-half hours and then poured into 2 liters of cold water. The mixture was cooled and the solid collected. The solid was recrystallized from 125 ml. of ethanol to yield 19.5 g. 2-chloro-6-phenylthiobenzonitrile, M.P. 67–72° C. In another run the recrystallized product melted at 73–74° C.

(2) 1-chlorothioxanthen-9-one.—A mixture containing 75 g. of 2-chloro-6-phenylthiobenzonitrile and 2.5 liters of polyphosphoric acid was heated with stirring for six hours at 150–170° C. The reaction mixture containing 1-chloro-9-iminothioxanthene as its hydrochloride was added to 12 liters of a water-ice mixture with stirring. The mixture was filtered and the filtrate containing the 9-imino salt was allowed to stand at room temperature for three days whereupon hydrolysis resulted to form a corresponding 1-chlorothioxanthen-9-one. Alternatively, this hydrolysis was carried out by warming the aqueous filtrate on a steam bath for several hours. The aqueous solution was then cooled to yield a solid precipitate. The separated solid was collected, dried, recrystallized from isopropyl alcohol and dried in a vacuum oven at 70° C. to yield 14.0 g. of 1-chloro-thioxanthen-9-one, M.P. 109–110° C. (corr.). A sample of this compound recrystallized a second time from isopropyl alcohol melted at 113–114° C. (corr.).

The utilization of 1-chlorothioxanthen-9-one in the synthesis of hycanthone is illustrated by Examples 3–6 inclusive.

(3) 1-[(2-diethylaminoethyl)methylamino]thioxanthen-9-one.—A mixture containing 100 g. of 1-chlorothioxanthen-9-one, 32.6 g. N,N-diethyl-N′-methylethylenediamine and 150 ml. of pyridine was refluxed with stirring for thirty-six hours. The solvent was distilled off under reduced pressure. To the residue was added 300 ml. of water and the water was distilled off under reduced pressure. The residue was taken up in 800 ml. of 10% aqueous acetic acid solution; 8 g. of decolorizing charcoal was added; and, the mixture was filtered. The filtrate was extracted twice with 200 ml. portions of ethyl acetate and then made alkaline with 300 ml. of 35% aqueous sodium hydroxide solution. The alkaline solution was extracted three times with 400 ml. portions of ethyl acetate. The combined ethyl acetate extracts were washed with two 200 ml. portions of cold water, dried over anhydrous magnesium sulfate and evaporated in vacuo to remove the solvent and to yield, as an oil, 50.5 g. of 1-[(2-diethylaminoethyl)methylamino]thioxanthene-9-one. A 5.0 g. portion of this compound was converted into its hydrochloride by dissolving it in isopropyl alcohol, adding an excess of concentrated hydrochloric acid, removing the liquids by heating in vacuo and crystallizing the residue from acetonitrile to yield 2.4 g. of 1-[(2-diethylaminoethyl)methylamino]thioxanthen-9-one dihydrochloride, M.P. 174° C. with decomposition.

(4) 1-[(2-diethylaminoethyl)methylamino]-9-oxothioxanthene-4-carboxaldehyde.—To 10.0 g. of 1-[(2-diethylaminoethyl)methylamino]thioxanthen-9-one dihydrochloride and 70 ml. of dimethylformamide was slowly added with stirring 5.5 ml. of phosphorus oxychloride whereupon an exothermic reaction caused the reaction temperature to rise to 55° C. The reaction mixture was then heated with stirring on a steam bath for one hour, cooled in an ice bath and poured into 200 ml. of ice water. The mixture was made alkaline with 30 ml. of 35% aqueous sodium hydroxide solution and the alkaline solution was extracted with three 100 ml. portions of chloroform. The combined chloroform extracts were washed with two 100 ml. portions of water, dried over anhydrous magnesium sulfate and evaporated in vacuo to remove the solvent. The residue was dissolved in 50 ml. of isopropyl alcohol; 2.5 ml. of concentrated hydrochloric acid was added; and, the mixture was evaporated in vacuo to leave a yellow semi-solid. The residue was dissolved in 200 ml. of warm isopropyl alcohol and stirred as a heavy yellow precipitate formed. The mixture was cooled in an ice bath, the solid was collected and dried overnight at 60° C. The solid was recrystallized from isopropyl alcohol and dried in vacuo at 60° C. to yield 5.1 g. of 1-[(2-diethylaminoethyl)methylamino] - 9-oxothioxanthene-4-carboxaldehyde as its hydrochloride, M.P. 202–204° C.

(5) 1 - (2 - diethylaminoethylamino) - 9 - oxothioxanthene-4-carboxaldehyde.—A 2.0 g. portion of 1-[(2-diethylaminoethyl)methylamino] - 9 - oxothioxanthene-4-carboxaldehyde was heated with 5.0 g. of pyridine hydrochloride at 140° C. for one hour. The reaction mixture was treated with water and the resulting mixture was made basic with 35% aqueous sodium hydroxide solution. The alkaline mixture was extracted with ether, the either extract dried over anhydrous magnesium sulfate and the solvent removed in vacuo. The oily residue was crystallized from isopropyl alcohol to yield 0.74 g. of 1-(2-diethylaminoethylamino)-9-oxo-thioxanthene-4 - carboxaldehyde. The identity of this known compound was confirmed by its tlc analysis, infrared spectrum, melting point and conversion to hycanthone in Example 6.

This reaction also was carried out in 87% yield in refluxing xylene for two and one-half hours.

(6) 1 - (2 - diethylaminoethylamino) - 4 - hydroxymethylthioxanthen-9-one.—A stirred mixture containing 0.74 g. of 1-(2-diethylaminoethylamino) - 9 - oxothioxanthene-4-carboxaldehyde and 100 ml. of methanol was treated portionwise at room temperature with sufficient sodium borohydride to reduce the 4-carboxaldehyde to the corresponding 4-hydroxymethyl compound; the reduction was followed by tlc analysis and was completed in less than one hour. The methanol was distilled off under reduced pressure and the oil was taken up with 50 ml. of benzene. The benzene solution was washed with water until the washings were at a pH of about 8.0. The benzene solution was dried over anhydrous magnesium sulfate, concentrated to a volume of about 15 ml., treated with 50 ml. of warm ether and allowed to stand. The resulting crystalline precipitate was collected and identified as 1-(2-diethylaminoethylamino)-4-hydroxymethylthioxanthen-9 - one by its melting point, its infrared, ultraviolet and nuclear magnetic resonance spectra, and its elemental analysis.

I claim:

1. The process which comprises reacting 2,6-dichlorobenzonitrile with an alkali metal thiophenoxide to yield 2-chloro-6-phenylthiobenzonitrile, heating said benzonitrile with polyphosphoric acid to produce 1-chloro-9-iminothioxanthene and hydrolyzing said 9-imino compound to produce 1-chlorothioxanthen-9-one.

2. The process according to claim 1 wherein the alkali metal is potassium.

No references cited.

HENRY R. JILES, Primary Examiner

C. M. S. JAISLE, Assistant Examiner

U.S. Cl. X.R.

260—465 G, 999